US008891525B2

(12) United States Patent
Addy (10) Patent No.: US 8,891,525 B2
(45) Date of Patent: Nov. 18, 2014

(54) FIXED MOBILE CONVERGENCE TECHNIQUES FOR REDUNDANT ALARM REPORTING

(75) Inventor: Kenneth Addy, Massapequa, NY (US)

(73) Assignee: Honeywell International Inc., Morristown, NJ (US)

( * ) Notice: Subject to any disclaimer, the term of this patent is extended or adjusted under 35 U.S.C. 154(b) by 1234 days.

(21) Appl. No.: 12/113,750

(22) Filed: May 1, 2008

(65) Prior Publication Data
US 2009/0274104 A1 Nov. 5, 2009

(51) Int. Cl.
H04L 12/28 (2006.01)
H04M 11/04 (2006.01)

(52) U.S. Cl.
CPC ................................. *H04M 11/04* (2013.01)
USPC ............ 370/392; 370/216; 370/228; 709/239

(58) Field of Classification Search
USPC ............................ 370/331, 332, 334; 709/239
See application file for complete search history.

(56) References Cited

U.S. PATENT DOCUMENTS

| 6,032,037 | A * | 2/2000 | Jeffers | 455/404.1 |
|---|---|---|---|---|
| 6,032,193 | A * | 2/2000 | Sullivan | 709/239 |
| 6,173,411 | B1 * | 1/2001 | Hirst et al. | 714/4.3 |
| 7,053,768 | B2 * | 5/2006 | Seshadri | 340/531 |
| 7,085,551 | B1 * | 8/2006 | Bonner et al. | 455/404.1 |
| 7,356,348 | B2 * | 4/2008 | Bifano et al. | 455/552.1 |
| 7,738,882 | B2 * | 6/2010 | Dutta et al. | 455/456.1 |
| 2001/0056503 | A1 * | 12/2001 | Hibbard | 709/250 |
| 2002/0151302 | A1 * | 10/2002 | Schmidt et al. | 455/426 |
| 2003/0086422 | A1 * | 5/2003 | Klinker et al. | 370/389 |
| 2006/0209857 | A1 * | 9/2006 | Hicks, III | 370/401 |
| 2006/0220831 | A1 * | 10/2006 | Martin | 340/507 |
| 2007/0030832 | A1 * | 2/2007 | Gonia et al. | 370/338 |
| 2008/0244148 | A1 * | 10/2008 | Nix et al. | 710/313 |
| 2009/0042536 | A1 * | 2/2009 | Bernard et al. | 455/406 |
| 2009/0047016 | A1 * | 2/2009 | Bernard et al. | 398/43 |
| 2009/0258672 | A1 * | 10/2009 | Camp et al. | 455/553.1 |
| 2010/0013625 | A1 * | 1/2010 | Kouzan et al. | 340/508 |

OTHER PUBLICATIONS

"The TCP/IP Guide"—http://www.tcpipguide.com/—Dec. 30, 2006.*
"Mobile IP Conditional Binding Update", Romdhani et al., 1st IEEE Workshop on Autonomic Communications and Network Management (ACNM'07), Munich, Germany, May 2007.*

* cited by examiner

*Primary Examiner* — Derrick Ferris
*Assistant Examiner* — Scott M Sciacca
(74) *Attorney, Agent, or Firm* — Husch Blackwell LLP (57) ABSTRACT

Alarm reporting systems and methods for reporting alarms to a central monitoring station using fixed mobile convergence (FMC) techniques. An alarm reporting system comprises a plurality of sensors, an alarm reporting module that receives alarm signals from the plurality of sensors, and a logic unit that generates an alarm message related to the alarm signal. The alarm reporting module further comprises at least two transceivers, the first of which is a wi-fi transceiver that communicates with a central monitoring station via a wireless access point further connected to an internet connection. The second transceiver is a cellular tranceiver that communicates with the central monitoring station via a cellular network further connected to an internet gateway. The second tranceiver provides redundancy in case the wireless access point or the first internet connection become unavailable.

21 Claims, 4 Drawing Sheets

FIXED MOBILE CONVERGENCE TECHNIQUES FOR REDUNDANT ALARM REPORTING

FIELD OF THE INVENTION

The present invention relates to building security and automation systems. Specifically, the present invention relates to using Fixed Mobile Convergence techniques for redundant alarm reporting.

BACKGROUND

Security and automation systems are more in use today than ever before. Improvements in communication technology make it easier to install an alarm that reports events to a central monitoring station in real-time. In particular, network technology allows alarm-reporting equipment to report events using a ubiquitous packet-based network such as the Internet. Further, with the advent of cellular technology, alarms may be reported to a central monitoring station via a standard cellular network such as a 3G network.

Given the increasing sophistication of security alarm and automation equipment and communications technology, it comes as no surprise that more information is being reported via such alarm reporting systems. For instance, not only does an alarm reporting system report the occurrence of an event, it also provides regular status updates. Further, multiple sensors may provide multiple status updates to an alarm control panel, which transmits this data constantly to a central monitoring station.

A reliable link between alarm reporting modules and central monitoring stations is vital. Alarm reporting modules that communicate using the internet may be capable of communicating with a wireless LAN (WLAN) by incorporating a wi-fi transceiver in the alarm reporting module. This provides network connectivity to a broadband modem, also on the LAN, that provides access to the internet. Some alarm reporting modules may alternatively be capable of communicating over a cellular network. A cellular transceiver communicates with a radio base station, and the base station provides access to the cellular network that is further coupled to the internet via a gateway.

However, there are inherent problems with the above methods. A WLAN is not the most reliable means for communication in all circumstances. For instance, a WLAN supporting heavy traffic may slow down or become unusable. A network node may lose power or become deactivated. In such a situation, a backup link is necessary that does not rely on the WLAN. Similarly, the local internet connection may fail in which case an alternate means for communicating with the central monitoring station is needed.

Cellular networks for transmitting data may not suffer from the setbacks described above. However, data transmission across cellular 3G networks (GPRS, CDMA, etc.) is expensive, especially when the connection is used constantly as in today's alarm reporting modules. Using an exclusively cellular transceiver would significantly increase installation, maintenance, and related costs of a security system.

Generic Access Technology (GAN) is a Fixed Mobile Convergence (FMC) technique allowing seamless roaming and handover between local and wide area networks using a dual-mode mobile phone. However, this and other existing FMC techniques have not been applied toward improving alarm reporting systems. What is needed is an alarm reporting system that maintains redundant channels of communication to the central monitoring station while minimizing costs.

SUMMARY OF THE INVENTION

The present invention uses FMC techniques to provide redundant communications channels between a security alarm or building automation system and a central monitoring station. The system is equipped with wireless local area network (WLAN) functionality, as well as cellular functionality, so that if any network elements or nodes in the WLAN are inaccessible, messages such as alarm reports and other information can be transmitted without interruption to a central monitoring station via a cellular network.

In one embodiment, an alarm reporting system comprises an alarm reporting module and a plurality of transceivers for transmitting a packet of data from the alarm reporting module to a central monitoring station. A logic unit generates a data packet, such as an alarm message, and transmits the data packet to a central monitoring station via a fixed packet-based network such as the internet. The logic unit first attempts to transmit the data packet via a WLAN, by using a wi-fi transceiver. The WLAN further comprises a broadband modem connected to an Internet Service Provider (ISP). The alarm message traverses the WLAN and the internet before arriving at the central monitoring station.

If, however, the WLAN or the internet connection fail for any reason, the alarm reporting module uses a cellular transceiver to transmit the message across a cellular network. The cellular transceiver is in communication with a cellular base station, which is further connected to a gateway providing access to the internet, such as a GGSN in a GPRS network. The alarm message traverses the cellular network and the internet until it reaches the central monitoring station.

In one embodiment, the alarm reporting system further comprises a femtocell that is connected to the broadband modem. If the WLAN is heavily trafficked or inaccessible for some reason, the logic unit transmits the alarm message via the cellular transceiver to the femtocell, which forwards the message to the central monitoring station via the internet. The femtocell thus acts like a home base station for the cellular transceiver, saving costs by not using the cellular network. If both the WLAN and the femtocell are inaccessible, or alternatively, if the broadband internet connection is inaccessible, then the cellular transceiver communicates via the cellular network as described above.

In another embodiment, a sensor transmits an alarm signal to an alarm reporting module. The sensor may be a smoke/fire detector, motion sensor, or any security sensor known in the art. The alarm signal may be triggered by the occurrence of an event, such as a fire, opening of a door or window, etc. Alternatively, the alarm signal may simply be a regularly transmitted status update. A logic unit within the control panel correlates the alarm signal to the corresponding event, and generates an alarm message to be transmitted to a central monitoring station. The alarm reporting module further comprises a first transceiver device capable of communicating with a WLAN, and a second transceiver device capable of communicating with a cellular base station. The WLAN and the cellular base station both provide access to a fixed network such as the internet. The logic unit first attempts to transmit the alarm message to a central monitoring station via the WLAN, using the first transceiver. If this fails, the logic unit then attempts to transmit the alarm message via the cellular network using the second transceiver.

In another embodiment, a femtocell may be used to deliver the message before resorting to the cellular network. The logic unit attempts to send the alarm message via the broadband internet connection using the second transceiver. Thus, the cellular network is used as a last resort, and costs are reduced by using the cellular network only when absolutely necessary.

In another embodiment the present invention is a method for communicating with a central monitoring station on a fixed network, the method comprising the steps of generating an alarm message in response to an alarm signal from a sensor, transmitting the alarm message using a LAN connected to a broadband modem, and, if the LAN is inaccessible, then transmitting the alarm message via a cellular network, wherein the cellular network provides access to the fixed network.

A related exemplary embodiment involves the use of a femtocell to transmit the alarm message to the central monitoring station via the broadband modem, before resorting to using the cellular network.

DETAILED DESCRIPTION

The present invention discloses an alarm reporting module equipped with a plurality of transceivers, wherein a first transceiver communicates with a Local Area Network (LAN) and a second transceiver communicates with a cellular base station. The alarm reporting module further comprises a logic unit that generates packets of data to be communicated to a central monitoring station. These packets of data include alarm messages that are generated by the logic unit upon receipt of an alarm signal generated by a sensor. The first transceiver may be an Ethernet adapter, such as a wi-fi transceiver. The second transceiver is a cellular transceiver. The alarm reporting module transmits the alarm message via the first transceiver across the WLAN. If this transmission is unsuccessful, or if the WLAN or the wireless access point (WAP) is inaccessible, then the alarm reporting module uses the cellular transceiver to transmit the alarm message via the cellular network. Since both the WLAN and the cellular network are in communication with the internet via their respective gateways, having multiple transceivers provides the alarm system with a backup option in case the preferred channel of communication is unavailable. Furthermore, by using the cellular network only when absolutely necessary, the alarm system saves costs associated with transmitting data over a cellular network.

For the purposes of the present invention, a cellular transceiver, or simply a transceiver, is a device containing both a transmitter and a receiver that can communicate with a cellular base station. For instance, on a mobile telephone, the entire unit is a transceiver. A transceiver within an alarm reporting module comprises a transmitter and a receiver capable of radio communication with a cellular macrocell base station, or a femtocell.

A cellular base station is a standard cellular base station employed by cellular network operators. These usually comprise a base transceiver station controlled by a base station controller (BSC), a plurality of antennae, and possibly a radio network controller, wherein the radio network controller carries out radio resource management and connects to the core network. A base station may be further connected to a gateway providing connectivity to a fixed packet-based network such as the internet. The BSC within a base station subsystem (BSS) may be linked to a gateway such as a Gateway GPRS Support Node (GGSN) or Gateway Mobile Switching Center (GMSC) to communicate with fixed networks such as an Internet Protocol (IP) network, IP Multimedia System (IMS), or a Public Switched Telephone Network, respectively.

A femtocell is a low-powered base station that resides within a building and provides a cellular transceiver with access to a fixed network. A femtocell typically comprises base station functionality, as well as means to communicate with a fixed network such as the internet. To access the internet, a femtocell may be connected to a broadband modem, or may simply incorporate within the femtocell an Ethernet or equivalent port to communicate with a fixed network.

A wireless local area network (WLAN) is a local area network such as an Ethernet network with wireless functionality such as wi-fi. A WLAN further comprises a wireless access point (WAP) which communicates with a wireless transceiver within the alarm reporting equipment. The WLAN is connected to the internet via a broadband router or modem.

A broadband router or modem is a fixed gateway to the internet, accessible via a WLAN. This includes cable, DSL, and equivalent means for accessing the internet. A broadband modem typically accesses the internet via the network of an internet service provider (ISP). A cellular network operator can also be an ISP, providing access to the internet via a gateway as described above.

The present invention will now be described with references to the figures.

Figure 1:
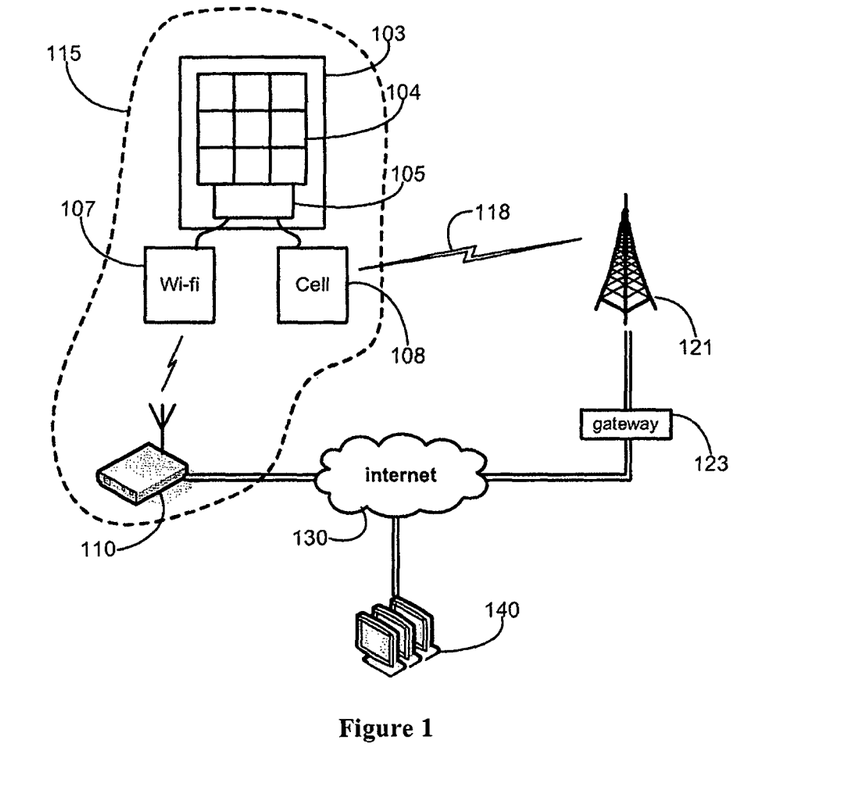
FIG. 1 shows an alarm reporting module with multiple transceivers, according to an exemplary embodiment of the present invention

FIG. 1 shows an alarm reporting module having multiple transceivers, according to an exemplary embodiment of the present invention. Alarm reporting module 103 has a user interface 104, a logic unit 105, and is coupled to transceivers 107 and 108. Transceiver 107 communicates with a router 110 on a local area network. Router 110 may incorporate a wireless access point, thus transceiver 107 can be a wi-fi transceiver. Router 110 may further comprise a broadband modem, providing access to a fixed network such as the internet 130. Transceiver 108 is a cellular transceiver and communicates with cellular base station 121. Base station 121 incorporates functionality to connect to a gateway 123. For instance, base station 121 may be part of a cellular GPRS network, further comprising a radio network controller that connects to a GGSN, which links the GPRS network to a fixed network such as internet 130. Thus, gateway 123 provides the cellular transceiver with access to the internet 130. Central monitoring station 140 is also connected to internet 130.

Alarm reporting module 103 is located within a secure area 115 that is monitored by alarm reporting module 103. Thus, WAP/modem 110 is within secure area 115, however this is not essential. Base station 121 will in most cases be located outside the secure area, and services a larger region known as a "cell." Central monitoring station 140 is also outside secure area, possibly located a great distance away. Packets of data traverse the internet to reach central monitoring station 140, which is known in the art, and may comprise a plurality of computer servers that correlate and analyze incoming messages from a plurality of alarm reporting modules in different locations. Central monitoring station 140 may further be part of a broader central monitoring network that is in communication with several first responders, such as police, fire, and emergency care units. Thus, if the alarm message is one of great urgency, central monitoring station 140 ensures that, upon receipt of the message, appropriate action is taken.

According to an embodiment of the invention, alarm reporting module 103 generates an alarm message that is to be sent to central monitoring station 140. Generation of the alarm message may be triggered upon receipt by alarm reporting module 103 of an alarm signal transmitted by a sensor (not shown). For instance, a sensor such as a carbon monoxide (CO) detector detects a dangerous level of CO and signals this to alarm reporting module 103. Logic unit 105 within alarm reporting module 103 correlates the alarm signal to the sensor and therefore to the event based on the type of sensor, and generates an alarm message to be transmitted to central monitoring station 140. Alternatively, the alarm message may be generated by logic unit 105 periodically to indicate a status or change of status within alarm reporting module 103. For instance, upon leaving a building, a user may activate a door alarm via user interface 104. The user may do this by typing in a code on a keypad or touch screen to activate the alarm. Other means for activating the alarm are known in the art. This activation generates an alarm message to be transmitted to central monitoring station 140, so central monitoring station 140 may do whatever it needs to do in response. In one embodiment, the alarm message may further comprise event-related data recorded by the sensor. For instance, a motion-sensing camera may transmit an alarm signal to alarm reporting module 103, wherein logic unit 105 also includes video footage from the camera in the alarm message to be sent to central monitoring station 140. Similarly, other multimedia information can be transmitted as part of the alarm message.

Logic unit 105 employs first transceiver 107 to transmit the alarm message to broadband modem 110. This communication can happen over any local network such as an Ethernet network. In one exemplary embodiment, transceiver 107 is a wi-fi transceiver and broadband modem 110 is on a WLAN, and may further comprise a WAP and a plurality of network nodes. If the alarm message successfully reaches broadband modem 110, modem 110 sends an acknowledge message (ACK) via WLAN back to transceiver 107. Logic unit 105 is thus aware that the WLAN is functional. Modem 110 then transmits the alarm message over the internet 130 to central monitoring station 140. Central monitoring station 140 comprises a plurality of servers, at least one of which has an IP address designated for receiving data packets from alarm reporting modules. On a packet-based network such as the internet, the header of the alarm message has the IP address of this server embedded, and thus the alarm message traverses the internet to reach central monitoring station 140. Upon a successful receipt, central monitoring station 140 transmits an ACK message back to modem 110 across the internet. Modem 110 forwards the ACK message to alarm reporting module 103.

The ACK messages indicate that all links between transceiver 107 and central monitoring station 140 are up and running. However, it is possible that there is a break in this link. In that case, an appropriate ACK message may not be transmitted to alarm reporting module 103. For instance, if a WAP on the WLAN is not functional, the first ACK message is never received, and alarm reporting module 103 is thus aware that the WLAN is not operational. Similarly, if the WLAN is operational, but the link between broadband modem 110 and internet 130 is not functional for some reason, such as inclement weather, the ACK message is never received from central monitoring station 140. Modem 110 may also be configured to transmit status messages to alarm reporting module 103. Thus, alarm reporting module 103 is aware of any breaks in the link to central monitoring station 140.

If the aforementioned link is broken, logic unit 105 will cause alarm reporting module 103 to employ second transceiver 108 to transmit the alarm message via radio waves 118 to cellular base station 121. Radio waves 118 comprise any current or future cellular technology such as GPRS, CDMA, and equivalents. Base station 121 may comprise a plurality of antennas, base station controllers, transceivers, and is connected to a gateway 123. Gateway 123 provides access to the internet, for instance, a GGSN in a GPRS network. The alarm message traverses cellular network 118, base station 121, gateway 123, and the internet 130 to reach central monitoring station 140.

Since data transmission over cellular networks is typically expensive, and communication over a broadband fixed network (via modem 110) is significantly less expensive, using the cellular service when absolutely necessary minimizes expenses. Furthermore, logic unit 105 keeps attempting to send packets over the WLAN. Until these are successful, the header of the alarm message can include an instruction to central monitoring station 140 to route return messages (such as ACK messages and other data) to use the cellular channel for communication. This can be achieved simply by modifying the sender's address field in the header to reflect an alternate address, such as a Session Initiation Protocol (SIP) address or a unique Mobile Station ID (MSID) for cellular transceiver 108. Central monitoring station has, of course, multiple transceivers to communicate over different channels and mediums. When WLAN and/or modem 110 is fully functional again, i.e. when the ACK messages are received, logic unit 105 will cause alarm reporting module 103 to stop using cellular transceiver 108 and revert back to using wi-fi transceiver 107. In alternate embodiments described in FIGS. 3 and 4, alarm reporting module 103 may also communicate with a femtocell via cellular transceiver 108, in the case that the WLAN is inaccessible and modem 110 is functional.

Figure 2:
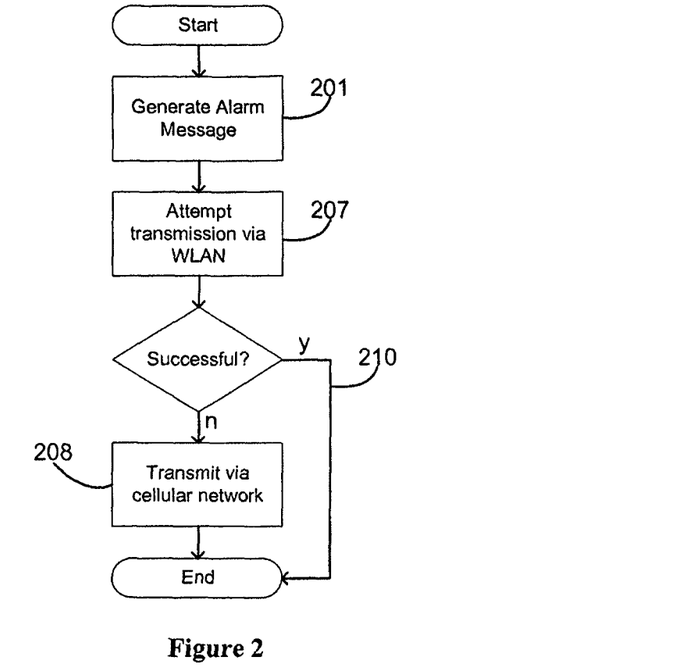
FIG. 2 shows the method steps performed by an alarm reporting module, according to an exemplary embodiment of the present invention.

FIG. 2 shows steps followed by logic unit 105 in transmitting an alarm message to central monitoring station 140. The first step (step 201) is the generation of an alarm message. This alarm message is any packet or packets of data that the alarm reporting module is sending to the central monitoring station. The alarm message may include status updates, configuration information, as well as details on alarm signals generated by sensors within the secure area covered by the alarm reporting module. The alarm message may also include multimedia data recorded by sensors such as CCTV cameras and audio. The alarm message is generated by a logic unit within the alarm reporting module, and includes a header containing routing and destination information.

Initially, the routing and destination information contains the IP address of the central monitoring station and the message is to be delivered via the internet. The alarm reporting module employs a wi-fi transceiver to attempt transmission (step 207) via a local WLAN, as described in FIG. 1. The WLAN may comprise a plurality of nodes, including a wireless access point (WAP) and a broadband modem connected to the internet. At any point in the link, a successful transmission triggers an ACK message to notify the alarm reporting module. For instance, the WAP receives the message, sends an ACK message to the alarm reporting module, and forwards the message to the modem. The modem receives the message, sends an ACK message to the alarm reporting module via the WAP, and forwards the alarm message to the central monitoring station via the internet. In some cases, there may be an intermediate server between the central monitoring station and the alarm reporting module. For instance, Honeywell's AlarmNet service is a server having a fixed IP address, which encrypts and authenticates data transferred between alarm reporting module and central monitoring station, and vice versa. Finally the central monitoring station receives the alarm message, and transmits an ACK message back to alarm reporting module. This constitutes a successful delivery (step 210).

Alternatively, ACK messages need not be used if WAP and broadband modem (as well as other network nodes) provide regular status updates back to the alarm reporting module. For instance, WAP may be aware of a broken link on the WLAN, or the modem may be aware that the internet connection is down, and will transmit a status update to the alarm reporting module via the wi-fi transceiver. This also constitutes an unsuccessful delivery for the purposes of delivering the alarm message via the wi-fi transceiver.

In either case of an unsuccessful wi-fi delivery, the alarm reporting module switches to using a cellular transceiver (step 208). The cellular transceiver may be enclosed within alarm reporting module and powered by the same power supply, or may be a separate transceiver connected to alarm reporting module by any means known in the art. In one embodiment, cellular transceiver is powered by a power supply unit having a backup battery, to comply with safety regulations. The logic unit within the alarm reporting module may additionally modify the routing and destination information in the alarm message to traverse the cellular network, and to inform the central monitoring station that the wi-fi link is not operational and to use the cellular link instead. This can be achieved by any means known in the art, including using SIP messaging. In either case, once the alarm message traverses the cellular network and the respective gateway to the internet, it reaches central monitoring station successfully. Thus, cellular network is a backup option in case the wi-fi network is heavily trafficked or inaccessible for some other reason.

As mentioned above, another embodiment of the present invention involves using a femtocell to transmit the alarm message. A femtocell is an extremely low-power base station that communicates directly with the cellular transceiver and provides a pathway for cellular devices to connect to a fixed network 130. Femtocells are known in the art, and typically comprise elements of macrocell base stations such as base station controllers (BSC) as well as radio network controllers (RNC) within a small portable unit. Femtocells provide high-speed mobile data inside buildings, at a significantly lower cost to operators because traffic is backhauled to the core network over the building's existing broadband link.

Figure 3:
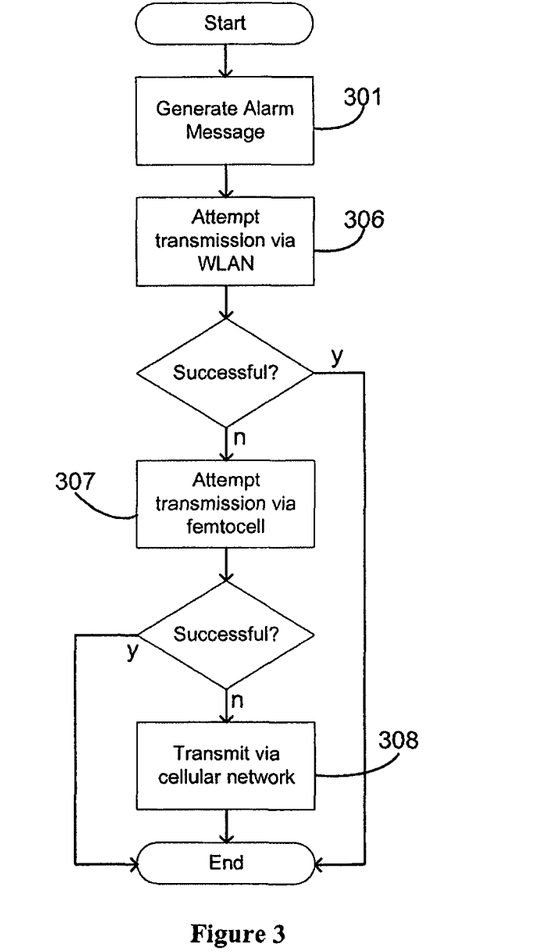
FIG. 3 shows alternative method steps performed by an alarm reporting module, according to another exemplary embodiment of the present invention.

FIG. 3 shows the method steps performed by the logic unit, similar to the ones in FIG. 2, but incorporating the femtocell as a third alternative. The first step (step 301) is the generation of an alarm message. The alarm reporting module employs a wi-fi transceiver to attempt transmission (step 306) via a local WLAN, as described in FIGS. 1 and 2. However this embodiment is different in that if wi-fi delivery is unsuccessful, the alarm reporting module switches to using a cellular transceiver to communicate via a femtocell (step 307). The logic unit within the alarm reporting module may additionally modify the routing and destination information in the alarm message to traverse the femtocell instead of the cellular network. This option may be used when it is determined that a WAP is not functional, but it is not yet known whether or not the broadband modem is operational. Since the femtocell connects to the broadband modem, not necessarily via the WLAN, it is an alternative means to traversing the WLAN.

In the present exemplary embodiment, the femtocell is in communication with the internet via the broadband modem. In another embodiment, the femtocell incorporates within itself similar means to access an internet connection. Thus, an external broadband router is not needed. Because the femtocell is a low-power device, the cellular transceiver can efficiently transmit data packets constantly to femtocell without interruption, even during a power outage, for amounts of time exceeding safety standards, assuming that an uninterruptible power supply (UPS) is present.

In case the femtocell delivery is unsuccessful, the alarm reporting module switches to using the cellular transceiver to communicate via the cellular network (step 308). The logic unit within the alarm reporting module may additionally modify the routing and destination information in the alarm message to traverse the cellular network, and to inform the central monitoring station that the wi-fi link is not operational and to use the cellular link instead. Once the alarm message traverses the cellular network and the respective gateway to the internet, it reaches central monitoring station successfully. Thus, cellular network is a final option in case the wi-fi network is heavily trafficked or inaccessible, or in case the internet connection is down thus rendering the femtocell pathway inaccessible.

In an alternative embodiment, a plurality of sensors may be placed at various points within a structure, and may send alarm signals to an alarm reporting module. These various sensors together secure an area controlled by a single alarm reporting module. In yet another embodiment, there may exist a plurality of secure areas, each monitored by an alarm reporting module, within close range. For instance, a shopping mall or strip mall may have a plurality of stores in close proximity to each other. Each store has a plurality of sensors to detect various changes such as smoke, temperature, as well as motion sensors to prevent robberies. Each store further has an alarm reporting module/control panel that receives alarm signals from the sensors. This plurality of alarm reporting modules is further equipped with cellular transceivers to communicate alarm messages to a central monitoring station.

Figure 4:
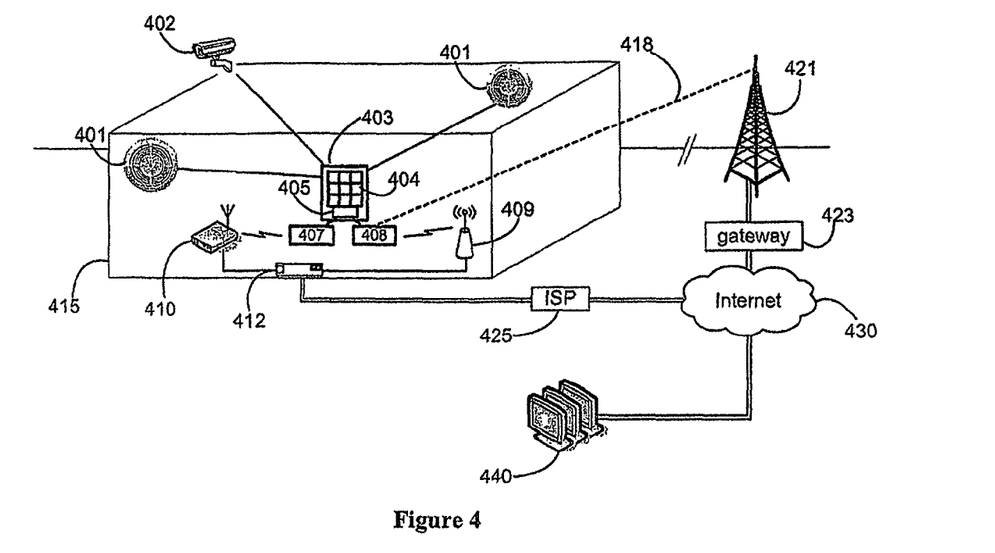
FIG. 4 shows an alarm reporting system in a secure area, according to an exemplary embodiment of the present invention.

FIG. 4 shows a plurality of alarm reporting modules accessing a single alarm reporting module, according to an exemplary embodiment of the present invention. Secure area 415 may be a home or office, or any structure that houses a security system. The security system includes a plurality of sensors 401, 402 that are in communication with an alarm reporting module/control panel 403. Sensors 401 may be heat sensors, smoke detectors, or similar sensors known in the art. Sensor 402 is a CCTV camera or a motion sensor, or a combination of the two. Communication between sensors 401, 402 and alarm reporting module 403 can be wired or wireless. The alarm signal may be triggered by an event, such as a change in the environment around the sensor, or it may be a regular status update, low battery indicator, movement detected by camera 402, and so on.

Alarm reporting module 403 comprises a user interface 404, logic unit 405, and transceivers 407 and 408. The wi-fi transceiver 407 communicates with a WAP/wireless router 410 wirelessly, or transceiver 407 may be a network adapter connected to the local Ethernet via router 410+Transceiver 408 is a cellular transceiver that communicates locally with a femtocell 409, and alternatively with cellular base station 421 via communication channel 418. Communication channel 418 is wireless and may be a GPRS, CDMA, or equivalent radio channel. The same may apply to the communication between cellular transceiver 408 and femtocell 409.

WAP 410 and femtocell 409 both provide Internet access. This access may be provided via a broadband modem 412, or alternatively, WAP/router 410 and femtocell 409 may have a built-in means for accessing a fixed network. Modem 412 could be a DSL or cable modem having an Ethernet jack, and router 410 and femtocell 409 may communicate with modem 412 via an Ethernet cable. Alternatively, both femtocell 409 and modem 412 could be capable of wi-fi communication. Other methods of linking these network elements will be known in the art. Similarly, cellular base station 421 offers the cellular transceiver 408 with access to the internet via a gateway 423. Both modem 412 and gateway 423 offer access to the same internet, which offers a means to connect to a central monitoring station 440 via IP, SIP, or equivalent means.

Logic unit 405 employs first transceiver 407 to transmit an alarm message to broadband modem 412. If the alarm message successfully reaches broadband modem 412, modem 412 sends an acknowledge message (ACK) via WLAN back to transceiver 407. Logic unit 405 is thus aware that the WLAN is functional Modem 412 then transmits the alarm message over the internet 430 to central monitoring station 440. Central monitoring station comprises a plurality of servers, at least one of which has an IP address designated for receiving data packets from alarm reporting modules. Upon a successful receipt, central monitoring station 440 transmits an ACK message back to modem 412 across the internet. Modem 412 forwards the ACK message to alarm reporting module 403.

In case there is a break in this link, an appropriate ACK message may not be transmitted to alarm reporting module 403. For instance, if WAP 410 on the WLAN is not functional, the first ACK message is never received, and alarm reporting module 403 is thus aware that the WLAN is not operational. Alternatively, WAP 410 may also be configured to transmit status messages to alarm reporting module 403. Thus, alarm reporting module 403 is aware of any breaks within the WLAN. At this point, alarm reporting module 403 switches to using cellular transceiver 408 to communicate via femtocell 409. The logic unit 405 within alarm reporting module 403 may additionally modify the routing and destination information in the alarm message to traverse femtocell 409 instead of the cellular network 418, 421. This option may be used when it is determined that a WAP is not functional, but it is not yet known whether or not the broadband modem is operational. Since the femtocell connects directly to the broadband modem, and not via the WLAN, it is an alternative means to using the WLAN. Further, since femtocell 409 is a low-powered cellular base station, transceiver 407 uses very little power to maintain communication with the femtocell.

Similarly, if the WLAN is operational, but the link between broadband modem 412 and internet 430 is not functional for some reason, such as inclement weather, the ACK message is never received from central monitoring station 440. In this case, alarm reporting module 403 switches to using cellular transceiver 408 to communicate via the cellular base station 421. Logic unit 405 within the alarm reporting module 403 may additionally modify the routing and destination information in the alarm message to traverse the cellular network, and to inform central monitoring station 440 that the wi-fi link is not operational and to use the cellular link instead. Once the alarm message traverses the cellular network and the respective gateway 423 to the internet 430, it reaches central monitoring station 440 successfully. In some cases, there may be an intermediate server (not shown) between the central monitoring station and the alarm reporting module. For instance, Honeywell's AlarmNet service is a server having a fixed IP address, which encrypts and authenticates data transferred between alarm reporting module and central monitoring station, and vice versa. Central monitoring station 440 is in constant communication with the internet, and terminals within central monitoring station 440 may be assigned an IP address or unique SIP address that the alarm message is destined for. Central monitoring station 440 then takes appropriate action to remedy the situation. For instance, the alarm message is a fire alert, central monitoring station 440 contacts a fire station to dispatch a truck to secure area 415. Alternatively, if the alarm message is simply a status update, then central monitoring station 440 may store the event in a database or take other pre-programmed actions.

Thus, the cellular network is a final option in case the wi-fi network is heavily trafficked or inaccessible, or in case the internet connection is down thus rendering the femtocell pathway inaccessible. This minimizes expenses associated with per-kilobyte data transfer across cellular networks. Furthermore, logic unit 405 keeps attempting to send packets over the WLAN. When WLAN 410 and/or modem 412 is filly functional again, alarm reporting module 403 stops using cellular transceiver 408 and reverts back to using wi-fi transceiver 407.

While preferred embodiments of the present invention have been described using specific terms, such description is for illustrative purposes only, and it is to be understood that changes and variations may be made without departing from the spirit or scope of the following claims.

The invention claimed is:

1. An alarm reporting system comprising:
    an alarm reporting module having a wi-fi transceiver and a cellular transceiver; and
    a logic unit that generates data packets to be transmitted to a central monitoring station via at least one of the wi-fi transceiver and the cellular transceiver,
    wherein the logic unit transmits the data packets to the central monitoring station via the wi-fi transceiver until the wi-fi transceiver receives an ACK message, and
    wherein a header of the data packets transmitted via the wi-fi transceiver includes instructions from the logic unit to the central monitoring station directing the central monitoring station to route return messages to the cellular transceiver until the wi-fi transceiver receives the ACK message.

2. The alarm reporting system of claim 1, further comprising:
    a Wireless Access Point (WAP) on a wireless local area network (WLAN) that receives the data packet from the logic unit via the wi-fi transceiver; and
    a broadband modem on the WLAN that transmits the data packet across the internet.

3. The alarm reporting system of claim 2, wherein the logic unit uses the cellular transceiver to transmit the data packet to a femtocell if the WAP is unavailable, said femtocell communicating with the broadband modem to forward the data packet across the internet.

4. The alarm reporting system of claim 3, wherein the logic unit uses the cellular transceiver to transmit the data packet to the femtocell if there is either a NACK response or if there is no ACK response from the WAP upon transmitting the data packet to the WAP.

5. The alarm reporting system of claim 3, wherein if the data packet cannot be delivered via both the WLAN and the femtocell, then the logic unit uses the cellular transceiver to transmit the data packet to a cellular base station, said cellular base station further comprising a gateway providing access to the internet.

6. The alarm reporting system of claim 5, wherein the logic unit uses the cellular transceiver to transmit the data packet to the cellular base station if there is either a NACK response or if there is no ACK response from the broadband modem upon transmitting the data packet to the broadband modem.

7. The alarm reporting system of claim 5, wherein the cellular transceiver forwards the data packet to the cellular base station via GPRS, and wherein the gateway is a GGSN.

8. The alarm reporting system of claim 2, wherein the data packet is an alarm message, the generation of said alarm message being triggered when the alarm reporting module receives an alarm signal from a sensor.

9. The alarm reporting system of claim 8, wherein the sensor generates the alarm signal in response to the happening of an event.

10. The alarm reporting system of claim 8, further comprising a plurality of sensors in wired or wireless communication with the alarm reporting module.

11. An alarm reporting system, comprising:
a sensor that generates an alarm signal;
a logic unit that receives the alarm signal and, in response, generates alarm messages to be sent to a central monitoring station;
a first transceiver that transmits the alarm message to the central monitoring station via a Local Area Network (LAN); and
a second transceiver that transmits the alarm messages to the central monitoring station via a cellular network if the LAN is unavailable;
wherein the logic unit transmits the alarm messages to the central monitoring station via the first transceiver until the first transceiver receives an ACK message; and
wherein a header of the alarm signal transmitted via the first transceiver includes instructions from the logic unit directing the central monitoring station to route return messages to the second transceiver until the first transceiver receives an ACK message.

12. The alarm reporting system of claim 11, wherein the LAN further comprises a gateway that provides access to a fixed network such as the Internet.

13. The alarm reporting system of claim 12, wherein the gateway is a broadband modem.

14. The alarm reporting system of claim 13, wherein if the LAN is unavailable, the cellular transceiver attempts to forward the alarm message via a femtocell, said femtocell communicating with the broadband modem to forward the alarm message via the internet.

15. The alarm reporting system of claim 12, wherein the first transceiver is a wi-fi transceiver that communicates with the gateway via a wireless LAN (WLAN).

16. The alarm reporting system of claim 11, wherein the second transceiver is a cellular transceiver that communicates with a cellular base station, said cellular base station further comprising a gateway that provides access to the internet.

17. The alarm reporting system of claim 16, wherein the second transceiver communicates with the base station via GPRS, and the gateway is a GGSN.

18. The alarm reporting system of claim 11, wherein the sensor transmits the alarm signal wirelessly.

19. A method for communicating with an alarm central monitoring station, said central monitoring station being connected to the internet, the method comprising:
generating alarm messages in response to an alarm signal from a sensor;
transmitting the alarm messages to a central monitoring station via a Local Area Network (LAN) until an ACK message is received, said LAN further providing access to the internet via a broadband modem;
including instructions in a header of the alarm message transmitted via the LAN directing the central monitoring station to route return messages via a cellular network until the alarm messages transmitted via the LAN receive an ACK message via the LAN; and
if the LAN is unavailable, transmitting the alarm message to the central monitoring station via the cellular network, said cellular network further providing access to the internet via a gateway.

20. The method of claim 19, wherein transmitting the alarm message via the LAN is performed by a wi-fi transceiver in communication with a wireless access point (WAP), and transmitting the alarm message via the cellular network is performed by a cellular transceiver in communication with a cellular base station connected to the gateway.

21. The method of claim 20, further comprising transmitting the alarm message to a femtocell if the WAP is unavailable, said femtocell further providing access to the internet via the broadband modem.

\* \* \* \* \*